United States Patent
Bernreitner et al.

(10) Patent No.: US 8,916,250 B2
(45) Date of Patent: Dec. 23, 2014

(54) SEWAGE PIPE COMPRISING BETA NUCLEATED POLYPROPYLENE MATERIAL WITH IMPROVED PROPERTIES

(75) Inventors: Klaus Bernreitner, Linz (AT); Elisabeth Hebesberger, Linz (AT); Franz Ruemer, St. Georgen/Gusen (AT)

(73) Assignee: Borealis AG, Vienna (AT)

( * ) Notice: Subject to any disclaimer, the term of this patent is extended or adjusted under 35 U.S.C. 154(b) by 235 days.

(21) Appl. No.: 12/998,248

(22) PCT Filed: Sep. 29, 2009

(86) PCT No.: PCT/EP2009/062617
§ 371 (c)(1),
(2), (4) Date: Mar. 30, 2011

(87) PCT Pub. No.: WO2010/037747
PCT Pub. Date: Apr. 8, 2010

(65) Prior Publication Data
US 2011/0200775 A1    Aug. 18, 2011

(30) Foreign Application Priority Data
Oct. 1, 2008    (EP) .................................. 08165630

(51) Int. Cl.
*C08K 3/34* (2006.01)
*C08L 23/12* (2006.01)
*C08K 5/00* (2006.01)

(52) U.S. Cl.
CPC .............. *C08K 5/0083* (2013.01); *C08L 23/12* (2013.01); *C08K 3/34* (2013.01)
USPC ...................................... 428/36.91; 428/35.7

(58) Field of Classification Search
CPC ......... C08K 5/34; C08K 5/0083; C08L 23/12
USPC ............................................. 428/36.91, 35.7
See application file for complete search history.

(56) References Cited

U.S. PATENT DOCUMENTS

| | | | | |
|---|---|---|---|---|
| 4,386,129 A | * | 5/1983 | Jacoby | 428/215 |
| 4,499,247 A | * | 2/1985 | Chiba et al. | 526/142 |
| 4,760,113 A | * | 7/1988 | Chiba et al. | 525/53 |
| 4,975,469 A | * | 12/1990 | Jacoby et al. | 521/84.1 |
| 4,981,938 A | * | 1/1991 | Hanari et al. | 526/351 |
| 5,218,052 A | * | 6/1993 | Cohen et al. | 525/240 |
| 5,231,126 A | * | 7/1993 | Shi et al. | 524/296 |
| 5,234,879 A | * | 8/1993 | Garoff et al. | 502/107 |
| 5,310,584 A | * | 5/1994 | Jacoby et al. | 428/2 |
| 5,387,386 A | * | 2/1995 | Kirjavainen | 264/171.29 |
| 5,681,922 A | * | 10/1997 | Wolfschwenger et al. | 528/486 |
| 5,716,998 A | * | 2/1998 | Munakata et al. | 521/58 |
| 6,169,144 B1 | * | 1/2001 | Higashi et al. | 525/88 |
| 6,187,402 B1 | * | 2/2001 | Ek et al. | 428/36.91 |
| 6,235,923 B1 | * | 5/2001 | Song et al. | 560/52 |
| 6,251,995 B1 | * | 6/2001 | Hesse et al. | 525/191 |
| 6,279,614 B1 | * | 8/2001 | Riesselmann et al. | 138/137 |
| 6,303,532 B1 | * | 10/2001 | Garoff et al. | 502/127 |
| 6,388,020 B2 | | 5/2002 | Raetzsch et al. | |
| 6,433,087 B1 | * | 8/2002 | Ebner et al. | 525/191 |
| 6,444,301 B1 | * | 9/2002 | Davidson et al. | 428/315.5 |
| 6,503,993 B1 | * | 1/2003 | Huovinen et al. | 526/348.1 |
| 6,632,850 B2 | * | 10/2003 | Hughes et al. | 521/82 |
| 6,747,103 B1 | * | 6/2004 | Vestberg et al. | 526/128 |
| 6,951,904 B1 | * | 10/2005 | Peeters et al. | 525/265 |
| 7,235,203 B2 | * | 6/2007 | Sadamitsu et al. | 264/210.7 |
| 7,799,397 B2 | * | 9/2010 | Ebner et al. | 428/35.7 |
| 8,304,049 B2 | * | 11/2012 | Machl et al. | 428/36.9 |
| 2003/0008091 A1 | * | 1/2003 | Konrad et al. | 428/36.9 |
| 2003/0157286 A1 | * | 8/2003 | Hesse et al. | 428/36.5 |
| 2004/0157969 A1 | * | 8/2004 | McGoldrick et al. | 524/210 |
| 2004/0158002 A1 | * | 8/2004 | McGoldrick et al. | 525/245 |
| 2004/0170790 A1 | * | 9/2004 | Ek et al. | 428/36.91 |
| 2005/0025922 A1 | * | 2/2005 | Rydin et al. | 428/36.91 |
| 2005/0053741 A1 | * | 3/2005 | Ebner et al. | 428/36.91 |
| 2005/0165156 A1 | * | 7/2005 | Rydin et al. | 524/543 |
| 2005/0277720 A1 | * | 12/2005 | Ek et al. | 524/425 |
| 2010/0071796 A1 | * | 3/2010 | Ek et al. | 138/140 |
| 2010/0285251 A1 | * | 11/2010 | Machl et al. | 428/36.9 |

FOREIGN PATENT DOCUMENTS

| | | |
|---|---|---|
| EP | 0 787 750 B1 | 8/1997 |
| EP | 1 260 545 A1 | 11/2002 |
| EP | 1 364 986 A1 | 11/2003 |
| EP | 1 382 638 A1 | 1/2004 |
| EP | 1 746 128 A1 | 1/2007 |
| EP | 1939167 A1 | 7/2008 |
| WO | WO 92/19653 | 11/1992 |
| WO | WO 92/19658 | 11/1992 |
| WO | WO 94/26794 | 11/1994 |
| WO | WO 03/037981 A1 | 5/2003 |
| WO | WO 2004/056922 A1 | 7/2004 |

OTHER PUBLICATIONS

Encycolpedia of Polymer Science and Engineering; vol. 6; pp. 522-564.

Zimm et al.; "The Dimensions of Chain Molecules Containing Branches and Rings"; Journal of Chemical Physics, vol. 17, No. 12; Dec. 1949; supplied by the British Library.

Turner-Jones et al.; "Crystalline Forms of Isotactic Polypropylene"; Imperial Chemical Industries Limited; Welwyn Garden City, Herts., England.

* cited by examiner

*Primary Examiner* — Michele L Jacobson

(74) *Attorney, Agent, or Firm* — Warn Partners, P.C.

(57) ABSTRACT

Polypropylene composition comprising: a propylene homopolymer (A), a platelet-like inorganic filler (B) having optionally α-nucleating activity and a β-nucleating agent (C), wherein the propylene composition and/or the propylene homopolymer has (have) a polydispersity index (PI) of at least 4.0.

23 Claims, No Drawings

SEWAGE PIPE COMPRISING BETA NUCLEATED POLYPROPYLENE MATERIAL WITH IMPROVED PROPERTIES

This application is a National Stage of International Application No. PCT/EP2009/062617, filed Sep. 29, 2009. This application claims priority to European Patent Application No. 08165630.8 filed on Oct. 1, 2008. The disclosures of the above applications are incorporated herein by reference.

The present invention relates to a new polypropylene composition with broad molecular weight distribution, as well as to its manufacture and use.

Polypropylene-based polymers have many characteristics which make them suitable for many applications as for instance pipes, like sewage pipes.

In general, polypropylene-based materials to be chosen for pipe applications should result in products of high impact performance as well as of good stiffness. However these properties are interrelated to each other and very often behave in a conflicting manner, meaning improving one of the properties can up to now only accomplished on the expense of the other property.

Stiffness can be improved by increasing the amount of homopolymer within the composition. As a consequence, the material becomes more brittle, thereby resulting in poor impact properties. Furthermore, high brittleness is usually accompanied by lower resistance to slow crack growth, thereby having a detrimental effect on durability.

However the pipe market seeks for materials enabling the manufacture of pipes with high ring stiffness. Thus stiffness levels are required of more than 1800 MPa. Even more demanding, the market whish to have polypropylene products with stiffness levels of more than 2000 MPa. Such an outstanding stiffness together with a satisfying toughness is commercially not yet available. Only polypropylene products with stiffness levels around 1700 MPa are on the market. However such materials show only a moderate impact performance. Such materials are normally based on polypropylene compositions with low amounts of elastomeric components.

To improve the impact strength of such materials usually the polypropylene compositions are β-nucleated.

For instance EP 1 260 545 A1 discloses pipes based on β-nucleated polypropylenes. Such pipes have good impact performance due to the β-nucleation, however the stiffness levels are far to low (below 1700 MPa).

EP 1 382 638 A1 is directed to β-nucleated polypropylene compositions. Also in this case the impact strength as well as the stiffness does not comply with the demanding standards for pipes nowadays.

EP 1 746 128 A1 describes a heterophasic propylene copolymer system which has been β-nucleated. Again due to the β-nucleation the obtained material suffers from low stiffness values.

WO 2003/037981 A1 is directed to pipe systems comprising a polymer composition of propylene copolymer with a C4-C10 α-olefin as comonomer and an ethylene-propylene rubber. Such compositions have very low stiffness (see example 2 and 3 of the international application).

Thus the object of the present invention is to provide a polymer composition which enables to provide test specimens and/or pipes with an excellent stiffness as well as an impact performance on a high level. Accordingly the present invention seeks for a polymer composition which enables to provide test specimens and/or pipes having a flexural modulus of more than 1800 MPa, more preferably of more than 2000 MPa and additionally having an impact strength at low temperatures (−20° C.) of at least 4.0 kJ/m$^2$, more preferably of at least 5.0 kJ/m$^2$, like of at least 6.0 kJ/m$^2$. Moreover the present invention is directed to pipes, like sewage pipes, with the aforesaid properties.

The finding of the present invention is to provide a polypropylene composition of a propylene homopolymer with a broad molecular weight distribution and which is partially crystallized in the β-form. A further finding of the present invention is that such a polypropylene composition should additionally comprise a platelet-like filler material optionally having α-nucleating activity. Such an inventive composition is in particular featured by the surprising synergistic effect, in terms of excellent stiffness and toughness, of the broad molecular weight distribution of the polymer material in a specific crystal modification in which platelet-like fillers are dispersed.

Thus the present invention is directed to a polypropylene composition comprising
(a) a propylene homopolymer (A)
(b) optionally a platelet-like inorganic filler (B) and
(c) a β-nucleating agent (C),
wherein
(i) the propylene composition and/or the propylene homopolymer (A) has (have) a polydispersity index (PI) of at least 4.0, and
(ii) preferably said polypropylene composition does not comprise an elastomeric polymer, more preferably the propylene homopolymer (A) is the only polymer component within said polypropylene composition.

Preferably the platelet-like inorganic filler (B) is present in the inventive polypropylene composition. Even more preferred the platelet-like inorganic filler (B) has an α-nucleating activity. A preferred example of such platelet-like inorganic filler (B) with an α-nucleating activity is talc.

The invention can be alternatively defined by a propylene composition comprising
(a) a propylene homopolymer (A) and
(b) optionally a platelet-like inorganic filler (B)
wherein
(i) the propylene composition and/or the propylene homopolymer has (have) a polydispersity index (PI) of at least 4.0,
(ii) the propylene composition and/or the propylene homopolymer is (are) partially β-nucleated, and
(iii) preferably said polypropylene composition does not comprise an elastomeric polymer, more preferably the propylene homopolymer (A) is the only polymer component within said polypropylene composition.

Preferably the platelet-like inorganic filler (B) is present in the inventive polypropylene composition. Even more preferred the platelet-like inorganic filler (B) has an α-nucleating activity. A preferred example of such platelet-like inorganic filler (B) with an α-nucleating activity is talc. The β-nucleation is preferably accomplished by a β-nucleating agent (C).

Thus the present invention is in particular directed to a polypropylene composition comprising
(a) a propylene homopolymer (A) comprising, i.e. consisting of, at least 97 wt.-% propylene units and
(b) a platelet-like inorganic filler (B), like a platelet-like inorganic filler (B) having an α-nucleating activity, i.e. talc, and
(c) a β-nucleating agent (C),
wherein the propylene composition and/or the propylene homopolymer (A)

(i) has(have) a polydispersity index (PI) of at least 4.0, and
(ii) is(are) partially β-nucleated as determined by DSC run according to ISO 3146/part 3/method C2 using second heat scan, and
(iii) preferably said polypropylene composition does not comprise an elastomeric polymer, more preferably the propylene homopolymer (A) is the only polymer component within said polypropylene composition Surprisingly it has been found out that with said polymer compositions test specimens and/or pipes are obtainable having superior stiffness behaviour compared to those being state of the art. Moreover not only the stiffness performance of the specimens and/or pipes based on the inventive polymer composition is outstanding but additionally also the impact performance is excellent. In particular the notched impact strength at low temperatures and the flexural modulus are above average (Tables 1 and 2).

The present invention demands two requirements for the propylene composition, namely the presence of a propylene homopolymer (A) with broad molecular weight distribution and an at least partial β-modification of the composition and/or propylene homopolymer. Further the presence of platelet-like inorganic fillers (B), in particular those having α-nucleating activity, can further improve the properties. Thus in a preferred embodiment these fillers (B) are part of the inventive polypropylene composition. In the following these requirements are defined in more detail.

First the polypropylene composition must comprise a propylene homopolymer (A) having a rather broad molecular weight distribution (MWD). Even more preferred the inventive polypropylene composition does not comprise an elastomeric component, like an elastomeric copolymer of propylene and at least one olefin comonomer, i.e. an ethylene-propylene rubber (EPR) as disclosed for instance in Encyclopedia of Polymer Science and Engineering, second edition, vol. 6, p. 545-558. An elastomeric component according to the understanding of the present invention is in particular a propylene copolymer with one or more copolymerizable C2 or C4 to C10 α-olefin(s), particularly ethylene, in the amount of at least 10 wt.-% in the elasomeric component. It is in particular preferred that the propylene homopolymer (A) is the only polymer component of said composition, i.e. the composition may comprise further additives, like the platelet-like inorganic filler (B) having optionally α-nucleating activity, for instance talc, and the β-nucleating agent (C) but no further other polymer. Thus the propylene homopolymer (A) represents preferably more than 80 wt.-%, more preferably more than 85 wt.-%, still more preferably more than 90 wt.-%, yet more preferably more than 95 wt.-%, like equal or more than 98 wt.-% of the polypropylene composition, whereas the remaining part, i.e. preferably not more than 20 wt.-%, more preferably not more than 15 wt.-%, still more preferably not more than 10 wt.-%, yet more preferably not more than 5 wt.-%, like equal or less than 2 wt.-% of the polypropylene composition represents non-polymer components, like β-nucleating agents (C) and platelet-like inorganic fillers (B) having optionally α-nucleating activity (talc).

Additionally it is appreciated that the polypropylene composition and/or the propylene homopolymer (A) is (are) not chemically modified as it is known for instance from high melt strength polymers (HMS-polymer). Thus the polypropylene composition and/or the propylene homopolymer (A) is (are) not cross-linked. The impact behaviour can normally also improved by using branched polypropylenes as for instance described in EP 0 787 750, i.e. single branched polypropylene types (Y-polypropylenes having a backbone with a single long side-chain and an architecture resembles a "Y"). Such polypropylenes are characterized by rather high melt strength. A parameter of the degree of branching is the branching index g'. The branching index g' correlates with the amount of branches of a polymer. The branching index g' is defined as $g'=[IV]_{br}/[IV]_{lin}$, in which g' is the branching index, $[IV]_{br}]$ is the intrinsic viscosity of the branched polypropylene and $[IV]_{lin}$ is the intrinsic viscosity of the linear polypropylene having the same weight average molecular weight (within a range of ±10%) as the branched polypropylene. Thereby, a low g'-value is an indicator for a high branched polymer. In other words, if the g'-value decreases, the branching of the polypropylene increases. Reference is made in this context to B. H. Zimm and W. H. Stockmeyer, J. Chem. Phys. 17,1301 (1949). This document is herewith included by reference. Thus it is preferred that the branching index g' of the propylene homopolymer (A) shall be at least 0.85, more preferably at least 0.90, yet more preferably at least 0.95, like 1.00.

The expression homopolymer used in the instant invention relates to a polypropylene that consists substantially, i.e. of at least 97 wt %, preferably of at least 98 wt %, more preferably of at least 99 wt %, still more preferably of at least 99.8 wt % of propylene units. In a preferred embodiment only propylene units in the propylene homopolymer are detectable. The comonomer content can be determined with FT infrared spectroscopy, as described below in the examples.

Even more preferred the propylene homopolymer is an isotactic propylene homopolymer. Thus it is preferred that the propylene homopolymer has a rather high pentad concentration, i.e. higher than 90%, more preferably higher than 92%, still more preferably higher than 95% and yet more preferably higher than 98%.

As stated above the polypropylene composition and/or the propylene homopolymer (A) must show a broad molecular weight distribution (MWD). A broad molecular weight distribution (MWD) of the polypropylene composition and/or the propylene homopolymer (A) is necessary as it supports the improved stiffness behaviour of the polypropylene composition. It may also improve the processability of the composition.

The molecular weight distribution (MWD) can be measured by SEC (also known as GPC), whereby it is expressed as Mw/Mn, or by a rheological measurement, like Polydispersity Index (PI)—measurement or Shear Thinning Index (SHI)—measurement. In the present case primarily the Polydispersity Index (PI) is used as measurement. All the measurements are known in art and further defined below in the example section.

Thus the polypropylene composition and/or the propylene homopolymer (A) has (have) a Polydispersity Index (PI) of at least 4.0, preferably of at least 4.5 more preferably of at least 5.0, still more preferably of at least 5.5, yet more preferably of at least 6.0, still yet more preferably of at least 7.0, like 7.5. Upper values of the Polydispersity Index (PI) may be 15.0, like 10.0. Thus the Polydispersity Index (PI) of the polypropylene composition and/or the propylene homopolymer (A) is (are) preferably in the range of 4.0 to 15.0, more preferably in the range of 4.5 to 12.0, yet more preferably in the range of 4.0 to 10.0, still more preferably in the range of 4.5 to 9.5 and still yet more preferably in the range of 5.0 to 9.5, like 6.5 to 9.5.

A further indicator for a broad molecular weight distribution ($M_w/M_n$) of the inventive polypropylene composition and/or the propylene homopolymer (A) is the weight average molecular weight ($M_w$). The weight average molecular weight ($M_w$) is the first moment of a plot of the weight of polymer in each molecular weight range against molecular weight.

The weight average molecular weight ($M_w$) is determined by size exclusion chromatography (SEC) using Waters Alliance GPCV 2000 instrument with online viscometer. The oven temperature is 145° C. Trichlorobenzene is used as a solvent (ISO 16014).

It is preferred that the polypropylene composition and/or the propylene homopolymer (A) has (have) a weight average molecular weight ($M_w$) of at least 500,000 g/mol, more preferably of at least 600,000 g/mol. Preferred ranges are from 650,000 g/mol to 1,500,000 g/mol, more preferably from 750,000 to 1,200,000 g/mol.

Furthermore, the propylene homopolymer (A) can be unimodal or multimodal, like bimodal.

The expression "multimodal" or "bimodal" used herein refers to the modality of the polymer, i.e. the form of its molecular weight distribution curve, which is the graph of the molecular weight fraction as a function of its molecular weight. As will be explained below, the polymer components of the present invention can be produced in a sequential step process, using reactors in serial configuration and operating at different reaction conditions. As a consequence, each fraction prepared in a specific reactor will have its own molecular weight distribution. When the molecular weight distribution curves from these fractions are superimposed to obtain the molecular weight distribution curve of the final polymer, that curve may show two or more maxima or at least be distinctly broadened when compared with curves for the individual fractions. Such a polymer, produced in two or more serial steps, is called bimodal or multimodal, depending on the number of steps.

In any case the Polydispersity Index (PI) and/or the weight average molecular weight ($M_w$) of the polypropylene composition and/or of the propylene homopolymer (A) as defined in the instant invention refer(s) to the total polypropylene composition and/or the total propylene homopolymer (A) be it unimodal or multimodal, like bimodal.

Further it is preferred that the polypropylene composition and/or the propylene homopolymer (A) has (have) a rather low melt flow rate. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.).

Accordingly it is preferred that the polypropylene composition and/or the propylene homopolymer (A) has (have) a melt flow rate $MFR_2$ (230° C.) of less than 3.0 g/10 min., more preferably less than 2.0 g/10 min., yet preferably less than 1.0 g/10 min., like less than 0.8 g/10min. A preferred range is 2.5 to 0.01 g/10min., more preferred 1.5 to 0.05 g/10min. and yet more preferred 1.0 to 0.1 g/10min.

Moreover it is preferred that the amount of xylene solubles of polypropylene composition and/or the propylene homopolymer (A) reaches a certain level. Xylene solubles are the part of the polymer soluble in cold xylene determined by dissolution in boiling xylene and letting the insoluble part crystallize from the cooling solution (for the method see below in the experimental part). The xylene solubles fraction contains polymer chains of low stereo-regularity and is an indication for the amount of non-crystalline areas. Accordingly it is appreciated that the amount of xylene solubles of polypropylene composition and/or the propylene homopolymer (A) is at least 1.6 wt.-%, more preferably at least 1.7 wt.-%. On the other hand the xylene solubles of polypropylene composition and/or the propylene homopolymer (A) should be not too high, i.e. not higher than 2.5 wt.-%, more preferably not higher than 2.3 wt.-%. Preferably xylene solubles are present in the polypropylene composition and/or the propylene homopolymer (A) from 1.5 to 2.5 wt.-%, more preferably from 1.6 to 2.3 wt.-%, like from 1.7 to 2.1 wt.-%.

As the second requirement the polypropylene composition and/or the propylene homopolymer (A) must be β-nucleated, i.e. the polypropylene composition must be partially crystallized in the β-modification. Thus it is preferred that the amount of β-modification of the polypropylene composition is from 60 to 90%, more preferably from 65 to 85%, still more preferably from 70 to 80% (as determined by DSC using the second heat as described in detail in the example section, i.e. DSC run according to ISO 3146/part 3/method C2 using as determined by DSC run according to ISO 3146/part 3/method C2 using second heat scan).

Of course the polypropylene composition comprises preferably also β-nucleating agents (C). As β-nucleating agent (C) any nucleating agent can be used which is suitable for inducing crystallization of the polypropylene composition and/or the propylene homopolymer (A) in the hexagonal or pseudo-hexagonal modification. Preferred β-nucleating agents (C) are those listed below, which also includes their mixtures.

Suitable types of β-nucleating agents (C) are dicarboxylic acid derivative type diamide compounds from $C_5$ to $C_8$-cycloalkyl monoamines or $C_6$ to $C_{12}$-aromatic monoamines and $C_5$ to $C_8$-aliphatic, $C_5$ to $C_8$-cycloaliphatic or $C_6$ to $C_{12}$-aromatic dicarboxylic acids, e.g.

N,N'-di-$C_5$-$C_8$-cycloalkyl-2,6-naphthalene dicarboxamide compounds such as N,N'-dicyclohexyl-2,6-naphthalene dicarboxamide and N,N'-dicyclooctyl-2, 6-naphthalene dicarboxamide, N,N-di-$C_5$-$C_8$-cycloalkyl-4,4-biphenyldicarboxamide compounds such as N,N'-dicyclohexyl-4,4-biphenyl-dicarboxamide and N,N'-dicyclopentyl-4,4-biphenyldicarboxamide, N,N'-di-$C_5$-$C_8$-cycloalkyl-terephthalamide compounds such as N,N'-dicyclohexylterephthalamide and N,N'-dicyclopentylterephthalamide, N,N'-di-$C_5$-$C_8$-cycloalkyl-1,4-cyclohexanedicarboxamide compounds such as N,N'-dicyclo-hexyl-1,4-cyclohexanedicarboxamide and N,N'-dicyclohexyl-1,4-cyclopentanedicarboxamide, diamine derivative type diamide compounds from $C_5$-$C_8$-cycloalkyl monocarboxylic acids or $C_6$-$C_{12}$-aromatic monocarboxylic acids and $C_5$-$C_8$-cycloaliphatic or $C_6$-$C_{12}$-aromatic diamines, e.g.

N,N-$C_6$-$C_{12}$-arylene-bis-benzamide compounds such as N,N'-p-phenylene-bis-benzamide and N,N'-1,5-naphthalene-bis-benzamide, N,N'-$C_5$-$C_8$-cycloalkyl-bis-benzamide compounds such as N,N'-1,4-cyclopentane-bis-benzamide and N,N'-1,4-cyclohexane-bis-benzamide, N,N-p-$C_6$-$C_{12}$-arylene-bis-$C_5$-$C_8$-cycloalkylcarboxamide compounds such as N,N'-1,5-naphthalene-bis-cyclohexanecarboxamide and N,N'-1,4-phenylene-bis-cyclohexanecarboxamide, and N,N'-C$_5$-C$_8$-cycloalkyl-bis-cyclohexanecarboxamide compounds such as N,N'-1,4-cyclopentane-bis-cyclohexanecarboxamide and N,N'-1,4-cyclohexane-bis-cyclohexanecarboxamide, amino acid derivative type diamide compounds from amidation reaction of C$_5$-C$_8$-alkyl, C$_5$-C$_8$-cycloalkyl-or C$_6$-C$_{12}$-arylamino acids, C$_5$-C$_8$-alkyl-, C$_5$-C$_8$-cycloalkyl-or C$_6$-C$_{12}$-aromatic monocarboxylic acid chlorides and C$_5$-C$_8$-alkyl-, C$_5$-C$_8$-cycloalkyl-or C$_6$-C$_{12}$-aromatic mono-amines, e.g.

N-phenyl-5-(N-benzoylamino)pentaneamide and N-cyclohexyl-4-(N-cyclohexyl-carbonylamino)benzamide.

Further suitable of β-nucleating agents (C) are quinacridone type compounds, e.g. quinacridone, dimethylquinacridone and dimethoxyquinacridone, quinacridonequinone type compounds, e.g. quinacridonequinone, a mixed crystal of 5,12-dihydro(2,3b)acridine-7,14-dione with quino(2,3b)acridine-6,7,13,14-(5H, 12H)-tetrone and dimethoxyquinacridonequinone and dihydroquinacridone type compounds, e.g. dihydroquinacridone, dimethoxydihydroquinacridone and dibenzodihydroquinacridone.

Still further suitable β-nucleating agents (C) are dicarboxylic acid salts of metals from group IIa of periodic system, e.g. pimelic acid calcium salt and suberic acid calcium salt; and mixtures of dicarboxylic acids and salts of metals from group IIa of periodic system.

Still further suitable β-nucleating agents (C) are salts of metals from group IIa of periodic system and imido acids of the formula

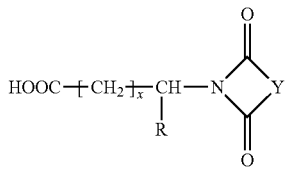

wherein x=1 to 4; R=H, —COOH, C$_1$-C$_{12}$-alkyl, C$_5$-C$_8$-cycloalkyl or C$_6$-C$_{12}$-aryl, and Y=C$_1$-C$_{12}$-alkyl, C$_5$-C$_8$-cycloalkyl or C$_6$-C$_{12}$-aryl-substituted bivalent C$_6$-C$_{12}$-aromatic residues, e.g.

calcium salts of phthaloylglycine, hexahydrophthaloylglycine, N-phthaloylalanine and/or N-4-methylphthaloylglycine.

Preferred β-nucleating agents (C) are any one or mixtures of N,N'-dicyclohexyl-2,6-naphthalene dicarboxamide, quinacridone type or pimelic acid calcium-salt (EP 0 682 066).

The amount of β-nucleating agents (C) is preferably up to 2.0 wt.-%, more preferably up to 1.5 wt.-%, like 1.0 wt.-%. Thus it is appreciated that the β-nucleating agents (C) are present within the inventive polypropylene composition from 0.0001 to 2.0000 wt.-%, more preferably from 0.0001 to 2.0000 wt.-% f, yet more preferably from 0.005 to 0.5000 wt.-%.

It is further appreciated that the inventive polypropylene composition comprises platelet-like inorganic fillers (B). Any type of filler is suitable as long as it has a platelet structure. Preferably the inorganic filler (B) is selected from the group consisting of mica, chalk, talc and mixtures thereof. In a preferred embodiment the platelet-like inorganic filler (B) is mica and/or talc.

As outlined above it is in particular appreciated that the inventive polypropylene composition and/or the propylene homopolymer crystallize(s) not only in the β-modification (due to the presence of the β-nucleating agents (C)) but also partly in the α-modification. To ensure that parts of the polypropylene composition and/or the propylene homopolymer crystallize in the α-modification the presence of platelet-like inorganic fillers (B) having α-nucleating activity within the composition is preferred. Any platelet-like inorganic filler (B) are then suitable as long as they have α-nucleating activity. Inorganic α-nucleating fillers (B) are substances with the ability to act as substrates for crystal formation by epitaxy thus increasing the number of nuclei of the system. Thereby the platelet-like α-nucleating fillers (B) improve the crystallization behaviour in processing, i.e. decreasing the cycle time or increasing the line speed, increase the crystallinity in the final product and, additionally and importantly, improve the optical and mechanical properties in terms of improved stiffness. Most preferably the platelet-like inorganic fillers (B) are talc, for instance talc with the CAS-number 14807-96-6 (379 g/mol).

There are also known non-inorganic α-nucleating fillers, i.e. organic α-nucleating agents and polymeric α-nucleating agents. Examples of an organic α-nucleating agent are aromatic carboxylic acid metal salts, aromatic carboxylic acids, and aromatic phosphoric acid metal salts; and examples of a polymeric crystal nucleating agent are polymers of 3-position branched olefins having at least 5 carbon atoms (e.g., 3,3-dimethylbutene-1, 3-methylbutene-1, 3-methylpentene-1, 3-methylhexene-1 or 3,5,5-trimethylhexene-1) and vinylcycloalkanes (e.g., vinylcyclopentane, vinylcyclohexane or vinylnorbornane). Most common non-inorganic α-nucleating agents are in particular those selected from the group consisting of sodium benzoate, 1,3:2,4-bis-(3,4-dimethyl-benzylidene)-sorbitol, sodium-2,2'-methylenebis-(4,6-di-tert-butyl-phenyl)-phosphate and hydroxybis-(2,4,8,10-tetra-tert-butyl-6-hydroxy-12h-dibenzo-(d,g)(1,3,2)-dioxaphosphocin-6-oxidato)-aluminium.

However the non-inorganic α-nucleating agents are not suitable for the present invention. First the non-inorganic α-nucleating agents are too effective, which means that the β-nucleation effect caused by the β-nucleating agents (C) is suppressed. Second the non-inorganic α-nucleating agents do not show a platelet-like structure, which is believed to further support the improvement of the stiffness while not degrading impact performance of the inventive polypropylene composition due to the layer-like integration of the platelet-like α-nucleating fillers (B) into the polymer material, in particular into the propylene homopolymer (A). Thus contrarily to the state of the art in which very effective α-nucleating agents are preferred, in the present inventions only α-nucleating agents are suitable having a rather low or moderate α-nucleating activity and are in the form of a platelet-like structure.

Accordingly it is preferred that the present inventive polypropylene composition is free of organic α-nucleating agents and/or polymeric nucleating agents, in particular free of those organic α-nucleating agents and polymeric nucleating agents as defined in the previous paragraph, like free of sodium benzoate, 1,3:2,4-bis-(3,4-dimethyl-benzylidene)-sorbitol, sodium-2,2'-methylenebis-(4,6-di-tert-butyl-phenyl)-phosphate and/or hydroxybis-(2,4,8,10-tetra-tert-butyl-6-hydroxy-12h- dibenzo-(d,g)(1,3,2)- dioxaphosphocin-6-oxidato)-aluminium. More preferably the present inventive polypropylene composition is free of any α-nucleating agents having a higher α-nucleating activity than talc.

On the other hand the polypropylene composition may comprise different platelet-like fillers (B) some of them having α-nucleating activity and some of them not. For instance—as stated above—the polypropylene composition may comprise talc and mica. However it is in particular preferred that as platelet-like fillers (B) only those are present which have α-nucleating activity. Thus it is especially preferred that the inventive polypropylene composition comprises only talc as platelet-like fillers (B), which means that the polypropylene composition does not contain any other platelet-like fillers, except those which may have β-nucleating activity.

The amount of platelet-like inorganic fillers (B), like talc, is preferably below 1.0 wt.-%, more preferably below 0.9 wt.-%, yet more preferably below 0.8 wt.-%. Preferably the platelet-like inorganic fillers (B), like talc, are from 0.1 to 1.0 wt.-%, more preferably from 0.2 to 0.9 wt.-% within the inventive polypropylene composition.

Additionally it is appreciated that the polypropylene composition enables to provide pipes, like sewage pipes, with a rather high resistance to deformation, i.e. have a high stiffness. Accordingly it is preferred that the polypropylene composition in an injection molded state and/or the pipes based on said polypropylene composition has/have a flexural modulus measured according to ISO 178 of at least 1800 MPa, more preferably of at least 1900 MPa, yet more preferably of at least 2000 MPa.

Furthermore it is appreciated that the polypropylene composition enables to provide pipes, like sewage pipes, having additionally rather high impact strength. Accordingly it is preferred that the polypropylene composition in an injection molded state and/or the pipes based on said polypropylene composition has/have an impact strength measured according the Charpy impact test (ISO 179 (1 eA)) at −20° C. of at least 4.0 $kJ/m^2$, more preferably of at least 4.5 $kJ/m^2$, yet more preferably of at least 5.0 $kJ/m^2$, still more preferably of at least 5.5 $kJ/m^2$, still yet more preferably of at least 6.0 $kJ/m^2$, like of at least 6.5 $kJ/m^2$.

The instant polypropylene composition has been in particular developed to improve the properties of pipes, like sewage pipes, in terms of stiffness by keeping the impact strength on a high level. Thus the instant invention is also directed to the use of the instant polypropylene composition for a pipe or part of a pipe, like a sewage pipe, and for the manufacture of pipes.

Furthermore, the present invention is also directed to pipes and/or pipe fittings, in particular sewage pipes, based on the polypropylene composition as defined in the instant invention. These pipes, in particular sewage pipes, are in particular characterized by the flexural modulus and impact strength as defined in the previous paragraphs.

The term "pipe" as used herein is meant to encompass hollow articles having a length greater than diameter. Moreover the term "pipe" shall also encompass supplementary parts like fittings, valves and all parts which are commonly necessary for e.g. a sewage piping system.

Pipes according to the invention also encompass single and multilayer pipes, where for example one or more of the layers is a metal layer and which may include an adhesive layer.

The polypropylene compositions used for pipes according to the invention may contain usual auxiliary materials, e.g. 0.01 to 2.5 wt.-% stabilizers and/or 0.01 to 1 wt.-% processing aids and/or 0.1 to 1 wt.-% antistatic agents and/or 0.2 to 3 wt.-% pigments and/or reinforcing agents, e.g. glass fibres, in each case based on the propylene composition used.

According to the present invention, there is also provided a process for preparing the polypropylene composition discussed above. Accordingly the propylene homopolymer (A) is produced and subsequently treated with β-nucleating agents (C) and optionally with platelet-like inorganic fillers (B), like talc.

Thus the manufacture of the inventive polypropylene composition comprises the steps of:
(a) producing a propylene homopolymer (A) as defined herein, preferably in a multistage process
(b) optionally treating said obtained propylene homopolymer (A) with a platelet-like inorganic filler (B), like talc, and subsequently
(c) treating the propylene homopolymer (A) of step (a) or the mixture of step (b) with a β-nucleating agent (C), preferably at temperatures in the range of 175 to 300° C., and
(d) optionally cooling and crystallizing the polypropylene composition, or
(a) producing a propylene homopolymer (A) as defined herein, preferably in a multistage process
(b) treating the propylene homopolymer (A) of step (a) with a β-nucleating agent (C), preferably at temperatures in the range of 175 to 300° C.,
(c) optionally treating said obtained mixture of step (b) with a platelet-like inorganic filler (B), like talc, and subsequently
(d) optionally cooling and crystallizing the polypropylene composition, or
(a) producing a propylene homopolymer (A) as defined herein, preferably in a multistage process and
(b) treating said obtained propylene homopolymer (A) with a β-nucleating agent (C) and optionally with a platelet-like inorganic filler (B), like talc, preferably at temperatures in the range of 175 to 300° C., and
(c) optionally cooling and crystallizing the polypropylene composition.

In the following the process will be described in more detail.

Preferably the propylene homopolymer (A) is produced in the presence of a Ziegler-Natta catalyst, in particular in the presence of a Ziegler-Natta catalyst capable of catalyzing polymerization of propylene at a pressure of 10 to 100 bar, in particular 25 to 80 bar, and at a temperature of 40 to 110° C., in particular of 60 to 100° C.

Generally, the Ziegler-Natta catalyst used in the present invention comprises a catalyst component, a cocatalyst component, an external donor, the catalyst component of the catalyst system primarily containing magnesium, titanium, halogen and an internal donor. Electron donors control the stereo-specific properties and/or improve the activity of the catalyst system. A number of electron donors including ethers, esters, polysilanes, polysiloxanes, and alkoxysilanes are known in the art.

The catalyst preferably contains a transition metal compound as a procatalyst component. The transition metal compound is selected from the group consisting of titanium compounds having an oxidation degree of 3 or 4, vanadium compounds, zirconium compounds, cobalt compounds, nickel compounds, tungsten compounds and rare earth metal compounds. The titanium compound usually is a halide or oxyhalide, an organic metal halide, or a purely metal organic compound in which only organic ligands have been attached to the transition metal. Particularly preferred are the titanium halides, especially titanium tetrachloride, titanium trichloride and titanium tetrachloride being particularly preferred.

Magnesium dichloride can be used as such or it can be combined with silica, e.g. by absorbing the silica with a solution or slurry containing magnesium dichloride. The lower alcohol used may preferably be methanol or ethanol, particularly ethanol.

One preferred catalyst to be used according to the invention is disclosed in EP 591 224 which discloses a method for preparing a pro-catalyst composition from magnesium dichloride, a titanium compound, a lower alcohol and an ester of phthalic acid containing at least five carbon atoms. According to EP 591 224, a trans-esterification reaction is carried out at an elevated temperature between the lower alcohol and the phthalic acid ester, whereby the ester groups from the lower alcohol and the phthalic ester change places.

The alkoxy group of the phthalic acid ester used comprises at least five carbon atoms, preferably at least eight carbon atoms. Thus, as the ester may be used propylhexyl phthalate, dioctyl phthalate, di-isodecyl phthalate and ditridecyl phthalate. The molar ratio of phthalic acid ester and magnesium halide is preferably about 0.2:1.

The transesterification can be carried out, e.g. by selecting a phthalic acid ester—a lower alcohol pair, which spontaneously or by the aid of a catalyst, which does not damage the pro-catalyst composition, transesterifies the catalyst at an elevated temperature. It is preferred to carry out the transesterification at a temperature which is 110 to 115° C., preferably 120 to 140° C.

The catalyst is used together with an organometallic cocatalyst and with an external donor. Generally, the external donor has the formula

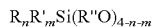

wherein

R and R' can be the same or different and represent a linear, branched or cyclic aliphatic, or aromatic group;

R" is methyl or ethyl;

n is an integer of 0 to 3;

m is an integer of 0 to 3; and n+m is 1 to 3.

In particular, the external donor is selected from the group consisting of cyclohexyl methylmethoxy silane (CHMMS), dicyclopentyl dimethoxy silane (DCPDMS), diisopropyl dimethoxy silane, di-isobutyl dimethoxy silane, and di-t-butyl dimethoxy silane.

An organoaluminium compound is used as a cocatalyst. The organoaluminium compound is preferably selected from the group consisting of trialkyl aluminium, dialkyl aluminium chloride and alkyl aluminium sesquichloride.

According to the invention, such catalysts are typically introduced into the first reactor only. The components of the catalyst can be fed into the reactor separately or simultaneously or the components of the catalyst system can be precontacted prior to the reactor.

Such pre-contacting can also include a catalyst pre-polymerization prior to feeding into the polymerization reactor. In the pre-polymerization, the catalyst components are contacted for a short period with a monomer before feeding to the reactor.

As stated above, the propylene homopolymer (A) can have a unimodal or multimodal, like bimodal, molar mass distribution (MWD). Thus, the equipment of the polymerization process can comprise any polymerization reactors of conventional design for producing propylene homopolymers (A). For the purpose of the present invention "slurry reactor" designates any reactor, such as a continuous or simple batch stirred tank reactor or loop reactor, operating in bulk or slurry and in which the polymer forms in particulate form. "Bulk" means a polymerization in reaction medium that comprises at least 60 wt.-% monomer. According to a preferred embodiment the slurry reactor comprises (is) a bulk loop reactor. By "gas phase reactor" is meant any mechanically mixed or fluid bed reactor. Preferably the gas phase reactor comprises a mechanically agitated fluid bed reactor with gas velocities of at least 0.2 msec.

Thus, the polymerization reactor system can comprise one or more conventional stirred tank slurry reactors, as described in WO 94/26794, and/or one or more gas phase reactors.

Preferably the reactors used are selected from the group of loop and gas phase reactors and, in particular, the process employs at least one loop reactor and at least one gas phase reactor. This alternative is particularly suitable for producing the propylene homopolymer (A) with a broad molecular weight distribution (MWD) according to this invention. By carrying out the polymerization in the different polymerization reactors in the presence of different amounts of hydrogen the MWD of the product can be broadened and its mechanical properties improved. It is also possible to use several reactors of each type, e.g. one loop reactor and two or three gas phase reactors or two loop reactors and one gas phase reactor, in series.

In addition to the actual polymerization reactors used for producing the propylene homopolymer (A) the polymerization reaction system can also include a number of additional reactors, such as pre- and/or post-reactors. The pre-reactors include any reactor for pre-polymerizing the catalyst with propylene. The post-reactors include reactors used for modifying and improving the properties of the polymer product.

All reactors of the reactor system are preferably arranged in series.

The gas phase reactor can be an ordinary fluidized bed reactor, although other types of gas phase reactors can be used. In a fluidized bed reactor, the bed consists of the formed and growing polymer particles as well as still active catalyst come along with the polymer fraction. The bed is kept in a fluidized state by introducing gaseous components, for instance monomer on such flowing rate which will make the particles act as a fluid. The fluidizing gas can contain also inert carrier gases, like nitrogen and also hydrogen as a modifier. The fluidized gas phase reactor can be equipped with a mechanical mixer.

The gas phase reactor used can be operated in the temperature range of 50 to 115° C., preferably between 60 and 110° C. and the reaction pressure between 5 and 50 bar and the partial pressure of monomer between 2 and 45 bar.

The pressure of the effluent, i.e. the polymerization product including the gaseous reaction medium, can be released after the gas phase reactor in order optionally to separate part of the gaseous and possible volatile components of the product, e.g. in a flash tank. The overhead stream or part of it is re-circulated to the reactor.

Alternately, the polypropylene homopolymers having a polydispersity index (PI) of at least 4.0 according to this invention can also be produced by variation of the polymerization conditions in at least one reactor on a timescale comparable or longer than the average residence time of the polymer particles in said reactor. More specifically, the hydrogen feed used for controlling the molecular weight of the polymer produced in said reactor can be varied in such a way to increase the polydispersity of the respectively produced polymer. The variation can be carried out in a stepwise fashion called "pulsating feed" or in a gradual fashion called "dynamic feed". This special polymerization step can be carried out either in a stirred tank or loop reactor in the liquid phase, but it can also be carried out in a gas phase reactor. The special polymerization step will preferably be combined with further polymerization steps carried out in a conventional fashion as described above, said polymerization steps being carried out before or after the special polymerization step.

After the polymerization the propylene homopolymer (A) is blended with the β-nucleating agent (C) and optionally with the platelet-like inorganic filler (B) to obtain the inventive polypropylene composition. The mixing can be carried out by methods known per se, e.g. by mixing the propylene homopolymer (A) with the β-nucleating agent (C) and optionally with the platelet-like inorganic filler (B) in the desired weight relationship using a batch or a continuous process. As examples of typical batch mixers the Banbury and the heated roll mill can be mentioned. Continuous mixers are exemplified by the Farrel mixer, the Buss co-kneader, and single- or twin-screw extruders.

In case pipes, preferably sewage pipe, shall be produced of the inventive polypropylene composition than after the manufacture of the inventive polypropylene composition the following steps follow.

In general the inventive polypropylene composition is extruded and subsequently formed into a pipe.

Accordingly the inventive pipe is preferably produced by first plasticizing the polypropylene composition of the instant invention in an extruder at temperatures in the range of from 200 to 300° C. and then extruding it through an annular die and cooling it.

The extruders for producing the pipe can be single screw extruders with an L/D of 20 to 40 or twin screw extruders or extruder cascades of homogenizing extruders (single screw or twin screw). Optionally, a melt pump and/or a static mixer can be used additionally between the extruder and the ring die head. Ring shaped dies with diameters ranging from approximately 16 to 2000 mm and even greater are possible.

The melt arriving from the extruder is first distributed over an annular cross-section via conically arranged holes and then fed to the core/die combination via a coil distributor or screen. If necessary, restrictor rings or other structural elements for ensuring uniform melt flow may additionally be installed before the die outlet. After leaving the annular die, the pipe is taken off over a calibrating mandrel, usually accompanied by cooling of the pipe by air cooling and/or water cooling, optionally also with inner water cooling.

Keeping the above information in mind the present invention relates in particular to the following embodiments:

[Paragraph 1] Polypropylene composition comprising
(a) a propylene homopolymer (A)
(b) optionally a platelet-like inorganic filler (B) and
(c) a β-nucleating agent (C),
wherein the propylene composition and/or the propylene homopolymer has (have) a polydispersity index (PI) of at least 4.0.

[Paragraph 2] Polypropylene composition comprising
(a) a propylene homopolymer (A)
(b) optionally a platelet-like inorganic filler (B) and
wherein the propylene composition and/or the propylene homopolymer
(iv) has (have) a polydispersity index (PI) of at least 4.0 and
(v) is(are) partially β-nucleated.

[Paragraph 3] Polypropylene composition according to [Paragraph for 2], wherein the platelet-like inorganic filler (B) has α-nucleating activity.

[Paragraph 4] Polypropylene composition according to anyone of the preceding [Paragraphs 1 to 3], wherein said platelet-like inorganic filler (B) is talc.

[Paragraph 5] Polypropylene composition according to anyone of the preceding [Paragraphs 1 to 4], wherein said composition and/or the propylene homopolymer (A) is (are) not cross-linked.

[Paragraph 6] Polypropylene composition according to anyone of the preceding [Paragraphs 1 to 5], wherein said composition and/or the propylene homopolymer (A) has (have) a branching index g' of at least 0.90, preferably of at least 0.95.

[Paragraph 7] Polypropylene composition according to anyone of the preceding [Paragraphs 1 to 6], wherein said composition does not comprise an elastomric polymer.

[Paragraph 8] Polypropylene composition according to anyone of the preceding [Paragraphs 1 to 7], wherein said propylene homopolymer (A) is the only polymer component within said polypropylene composition.

[Paragraph 9] Polypropylene composition according to anyone of the preceding [Paragraphs 1 to 8], wherein the amount of β-modification of the polypropylene composition and/or propylene homopolymer (A) is in the range of 60 to 90%.

[Paragraph 10] Polypropylene composition according to anyone of the preceding [Paragraphs 1 to 9], wherein said propylene homopolymer (A) is an isotactic propylene homopolymer.

[Paragraph 11] Polypropylene composition according to anyone of the preceding [Paragraphs 1 to 10], wherein said propylene homopolymer (A) has an $MFR_2$ (230° C.) of below 1.0 g/10 min measured according to ISO 1133.

[Paragraph 12] Polypropylene composition according to anyone of the preceding [Paragraphs 1 to 11], wherein said propylene homopolymer (A) has a weight average molecular weight ($M_w$) of at least 500.000 g/mol.

[Paragraph 13] Polypropylene composition according to anyone of the preceding [Paragraphs 1 to 12], wherein said polypropylene composition and/or said propylene homopolymer (A) has (have) a xylene soluble fraction of at least 1.3 wt.-%.

[Paragraph 14] Polypropylene composition according to anyone of the preceding [Paragraphs 1 to 13], wherein said propylene homopolymer is present within the total composition of at least 85 wt.-%, more preferably of at least 95 wt.-%.

[Paragraph 15] Polypropylene composition according to anyone of the preceding [Paragraphs 1 to 14], wherein said platelet-like inorganic filler (B), preferably talc, is present within the total polypropylene composition up to 1.0 wt.-%, preferably in the range of 0.1 to 1.0 wt.-%.

[Paragraph 16] Polypropylene composition according to anyone of the preceding [Paragraphs 1 to 15], wherein said β-nucleating agent (C) is present within the total polypropylene composition up to 1.0 wt.-%, preferably in the range of 0.0001 to 1.0000 wt.-%.

[Paragraph 17] Polypropylene composition according to anyone of the preceding [Paragraphs 1 to 16], wherein said β-nucleating agent (C) is selected from the group consisting of N,N'-dicyclohexyl-2,6-naphthalene dicarboxyamide, quinacridone types, pimelic acid calcium salt and mixtures thereof.

[Paragraph 18] Polypropylene composition according to anyone of the preceding [Paragraphs 1 to 17], wherein said polypropylene composition has an impact strength measured according to the Charpy impact test (ISO 179(1 eA)) at −20° C. of at least 6.5 kJ/m².

[Paragraph 19] Polypropylene composition according to anyone of the preceding [Paragraphs 1 to 18], wherein said polypropylene composition has a flexural modulus measured according to ISO 178 of at least 1800 MPa, preferably of at least 2000 MPa.

[Paragraph 20] Use of the polypropylene composition according to anyone of the preceding [Paragraphs 1 to 19] for pipes, preferably sewage pipes.

[Paragraph 21] Pipe, preferably sewage pipe, comprising a polypropylene composition according to anyone of the preceding [Paragraphs 1 to 19].

[Paragraph 22] Process for the manufacture of a polypropylene composition according to any one of the preceding [Paragraphs 1 to 19] comprising the steps of:
(a) producing a propylene homopolymer (A) as defined in anyone of the [Paragraphs 1 to 18], preferably in a multistage process,
(b) optionally treating said obtained propylene homopolymer (A) with a platelet-like inorganic filler (B), like talc, and subsequently
(c) treating the propylene homopolymer (A) of step (a) or the mixture of step (b) with a β-nucleating agent (C)
or
(a) producing a propylene homopolymer (A) as defined in anyone of the [Paragraphs 1 to 18], preferably in a multistage process
(b) treating the propylene homopolymer (A) of step (a) with a β-nucleating agent (C), preferably at temperatures in the range of 175 to 300° C.,
(c) optionally treating said obtained mixture of step (b) with a platelet-like inorganic filler (B), like talc, and subsequently
(d) optionally cooling and crystallizing the polypropylene composition,
or
(a) producing a propylene homopolymer (A) as defined in anyone of the [Paragraphs 1 to 18], preferably in a multistage process, and
(b) treating said obtained propylene homopolymer (A) with a β-nucleating agent (C) and optionally with a platelet-like inorganic filler (B), like talc.

[Paragraph 23] Process for the manufacture of a pipe, preferably sewage pipe, according to claim 22, wherein the polypropylene composition according to any one of the preceding [Paragraphs 1 to 19] is extruded and subsequently formed to a pipe, like sewage pipe.

The present invention will now be described in further detail by the examples provided below.

EXAMPLES

1. Definitions/Measuring Methods

The following definitions of terms and determination methods apply for the above general description of the invention as well as to the below examples unless otherwise defined.

Weight average molecular weight ($M_w$) is determined by Gel Permeation Chromatography (GPC) according to the following method:

The weight average molecular weight ($M_w$) is measured by a method based on ISO 16014-1:2003 and ISO 16014-4:2003. A Waters Alliance GPCV 2000 instrument, equipped with refractive index detector and online viscosimeter was used with 3× TSK-gel columns (GMHXL-HT) from Toso-Haas and 1,2,4-trichlorobenzene (TCB, stabilized with 200 mg/L 2,6-Di tert butyl-4-methyl-phenol) as solvent at 145° C. and at a constant flow rate of 1 mL/min 216.5 µL of sample solution were injected per analysis. The column set was calibrated using relative calibration with 19 narrow MWD polystyrene (PS) standards in the range of 0.5 kg/mol to 11 500 kg/mol and a set of well characterised broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Rheology: Dynamic rheological measurements were carried out with Rheometrics RDA-II QC on compression molded samples under nitrogen atmosphere at 200° C. using 25 mm-diameter plate and plate geometry. The oscillatory shear experiments were done within the linear viscoelastic range of strain at frequencies from 0.01 to 500 rad/s. (1506721-1)

The values of storage modulus (G'), loss modulus (G"), complex modulus (G*) and complex viscosity (η*) were obtained as a function of frequency (ω).

The Zero shear viscosity ($η_0$) was calculated using complex fluidity defined as the reciprocal of complex viscosity. Its real and imaginary part are thus defined by $$f'(ω)=η'(ω)/[η'(ω)^2+η''(ω)^2] \text{ and}$$

$$f''(ω)=η''(ω)/[η'(ω)^2+η''(ω)^2]$$

from the following equations $$η'=G''/ω \text{ and } η''=G'/ω$$

$$f'(ω)=G''(ω)*ω/[G'(ω)^2 G''(ω)^2]$$

$$f''(ω)=G'(ω)*ω/[G'(ω)^2 G''(ω)^2]$$

The polydispercity index, PI, is calculated from cross-over point of G'(ω) and G"(ω). There is a linear correlation between f' and f" with zero ordinate value of $1/η_0$ (Heino et al.[1]) For polypropylene this is valid at low frequencies, and the first five points (5 points/decade) are used in calculation of $η_0$.

Shear thinning indexes (SHI), which are correlating with MWD and are independent of MW, were calculated according to Heino [1,2] (below).

SHI is calculated by dividing the Zero Shear Viscosity by a complex viscosity value, obtained at a certain constant shear stress value, G*. The abbreviation, SHI (0/50), is the ratio between the zero shear viscosity and the viscosity at the shear stress of 50 000 Pa.

1) Rheological characterization of polyethylene fractions. Heino, E. L.; Lehtinen, A; Tanner, J.; Seppälä, J. Neste Oy, Porvoo, Finland. Theor. Appl. Rheol., Proc. Int. Congr. Rheol., 11th (1992), 1 360-362
2) The influence of molecular structure on some rheological properties of polyethylene. Heino, Eeva-Leena. Borealis Polymers Oy, Porvoo, Finland. Annual Transactions of the Nordic Rheology Society, 1995

NMR-Spectroscopy Measurements:

The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the pentad analysis the assignment is done according to the methods described in literature: (T. Hayashi, Y. Inoue, R. Chüjö, and T. Asakura, Polymer 29 138-43 (1988).and Chujo R, et al, Polymer 35 339 (1994).

The NMR-measurement was used for determining the mmmm pentad concentration in a manner well known in the art.

$MFR_2$ is measured according to ISO 1133 (230° C., 2.16 kg load).

Comonomer content of C2 is measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of —$CH_2$— absorption peak (800-650 cm$^{-1}$) was measured with Perkin Elmer FTIR 1600 spectrometer. The method was calibrated by ethylene content data measured by $^{13}$C-NMR.

Content of β-modification: The β-crystallinity is determined by Differential Scanning calorimetry (DSC). DSC is run according to ISO 3146/part 3/method C2 in a heat/cool/heat cycle with a scan rate of 10° C./min in the temperature range of +23 to +210° C. The amount of β-modification is calculated from the second heat by the following formula:

$$\beta\text{-area}/(\alpha\text{-area}+\beta\text{-area})$$

Since the thermodynamical β-modification starts to be changed into the more stable α-modification at temperatures above 150° C., a part of the β-modification is transferred within the heating process of DSC-measurement. Therefore, the amount of β-PP determined by DSC is lower as when measured according to the method of Turner-Jones by WAXS (A. Turner-Jones et. al., Makromol. Chem 75 (1964) 134).

"Second heat" means that the sample is heated according to ISO 3146/part 3/method C2 for a first time and then cooled to room temperature at a rate of 10° C./min. The sample is then heated a second time, also according to ISO 3146/part 3/method C2. This second heat is relevant for measurement and calculation.

During the "first heat" all thermal history of the sample giving rise to different crystalline structure, which typically comes from different processing conditions and/or methods, is destroyed. Using the second heat for determination of β-crystallinity, it is possible to compare samples regardless of the way the samples were originally manufactured.

The xylene solubles (XS, wt.-%): Analysis according to the known method (ISO 6427): 2.0 g of polymer is dissolved in 250 ml p-xylene at 135° C. under agitation. After 30±2 minutes the solution is allowed to cool for 15 minutes at ambient temperature (21° C.) and then allowed to settle for 30 minutes at 25±0.5° C. The solution is filtered and evaporated in nitrogen flow and the residue dried under vacuum at 90° C. until constant weight is reached.

$XS\% = (100 \times m_1 \times v_0)/(m_0 \times v_1)$, wherein $m_0$=initial polymer amount (g)

$m_1$=weight of residue (g)

$v_0$=initial volume (ml)

$V_1$=volume of analyzed sample (ml)

Melting temperature Tm, crystallization temperature Tc, and the degree of crystallinity: measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Intrinsic viscosity is measured according to DIN ISO 1628/1, October 1999 (in Decalin at 135° C.).

Flexural modulus is measured according to ISO 178.

The flexural modulus is measured on samples prepared from injection molded specimens as described in EN ISO 1873-2 (80×10×4 mm)

Tensile Modulus is measured according to ISO 527-2 (cross head speed=50 mm/min; 23° C.) using injection molded specimens as described in EN ISO 1873-2 (dog bone shape, 4 mm thickness).

Charpy impact test: The charpy notched impact strength (Charpy NIS) is measured according to ISO 179 1 eA at −20° C., respectively. For the preparation of the injection molded test specimens and the compression molded test specimens see "flexural modulus".

2. Preparation of the Examples and Properties

Comparative Example 1 (CE1)

Is the commercial polypropylene homopolymer BE 50 of Borealis having an MFR (230° C./2.16 kg) of 0.2 g/10 min.

Comparative Example 2 (CE2)

Is the commercial polypropylene homopolymer BE 50 of Borealis mixed with 0.1 wt % of the platelet-like inorganic filler talc of the type Luzenac A3 (Luzenac) having a top-cut (95% less than) of 3 µm, said composition having an MFR (230° C./2.16 kg) of 0.3 g/10 min Comparative Example 3 (CE3)

Is the commercial polypropylene homopolymer BE 50 of Borealis mixed with 2 wt % of α-nucleation masterbatch containing 0.25 wt % of the β-nucleating agent γ-quinacridone, said composition having an MFR (230° C./2.16 kg) of 0.3 g/10 min.

Comparative Example 4 (CE4)

It is an experimental polypropylene homopolymer. It has been produced in a Borstar PP pilot plant as follows: As a catalyst one has been used as defined in EP 0 491 566 A2; EP 0 591 224 B1 or EP 0 586 390 B1 (Ti=1.9 wt.-%), DCPDMS was used as donor and TEA as cocatalyst with a TEA/Ti ratio [mol/mol] of 200 and a TEA/donor ratio [mol/mol] of 5. The first polymerization step was carried out in a loop reactor at a temperature of 85° C. and a pressure of 5500 kPa feeding propylene with 80 ppm of hydrogen. The resulting polymer was transferred without special separation from the process gas to the subsequent reactors. A second and third polymerization step were carried out in two subsequent gas phase reactors at a temperature of 85° C. and a pressure of 3300 kPa, respectively feeding further propylene with 300 ppm hydrogen in the first gas phase reactor and 1500 ppm hydrogen in the second gas phase reactor. After deactivation of the catalyst with steam and drying of the resulting polymer powder with warm nitrogen, the resulting polypropylene homopolymer was compounded together with 0.07 wt % Calcium Stearate and 0.60% Irganox B225 (antioxidant combination supplied by Ciba Specialty Chemicals) in a twin screw extruder at 270 to 300° C. A final MFR (230° C./2.16 kg) of 0.35 g/10 min was measured for this polymer.

Comparative Example 5 (CE5)

The polypropylene homopolymer of CE4 has been used. It has been mixed with 0.5 wt % of the platelet-like inorganic filler talc of the type Luzenac A3 having a top-cut (95% less than) of 3 µm.

Comparative Example 6 (CE6)

The polypropylene homopolymer of CE4 has been used. It has been mixed with 0.2 wt % of the -nucleating agent AdekaStab NA-11 UH (supplied by Adeka Palmarole).

Inventive Example 1 (E1)

The polypropylene homopolymer of CE5 has been used. It has been mixed with 2 wt % of a β-nucleation masterbatch containing 0.25 wt % of the β-nucleating agent γ-quinacridone.

Inventive Example 2 (E2)

The polypropylene homopolymer of CE5 has been used. It has been mixed with 0.5 wt % of the platelet-like inorganic filler talc of the type Luzenac A3 having a top-cut (95% less than) of 3 μm and 2 wt % of a β-nucleation masterbatch containing 0.25 wt % of the β-nucleating agent γ-quinacridone.

TABLE 1

Properties of the polypropylene compositions

|  | Unit | CE1 | CE2 | CE3 |
|---|---|---|---|---|
| polymer type |  | H-PP | H-PP | H-PP |
| polymer amount | [wt.-%] | 100 | 99.9 | >99.9 |
| α-nucleating agent type |  | — | talc | — |
| α-nucleating agent amount | [wt.-%] | — | 0.10 | — |
| β-nucleating agent type |  | — | — | QA |
| β-nucleating agent amount | [wt.-%] | — | — | 0.005 |
| β-content | [%] | 0 | 0 | 80 |
| PI | [%] | 3.6 | 3.6 | 3.7 |
| $M_w$ | [g/mol] | 1,070,000 | 1,070,000 | 1,070,000 |
| Tm | [° C.] | 165 | 166 | 152 |
| $MFR_2$ | [g/10 min] | 0.20 | 0.3 | 0.3 |
| XS | [wt.-%] | 1.6 | 1.5 | 1.8 |
| Ethylene content | [wt.-%] | — | — | — |
| Flexural Modulus | [MPa] | 1878 | 1950 | 1634 |
| Notched Impact Strength (−23° C.) | [kJ/m$^2$] | 10.6 | 6.7 | 91 |
| Notched Impact Strength (−20° C.) | [kJ/m$^2$] | 2.2 | 1.9 | 6.6 |

QA: γ-quinacridone

TABLE 2

Properties of the polypropylene compositions

|  | Unit | CE4 | CE5 | CE6 | E1 | E2 |
|---|---|---|---|---|---|---|
| polymer type |  | H-PP | H-PP | H-PP | H-PP | H-PP |
| polymer amount | [wt.-%] | 100 | 99.5 | 99.8 | >99.9 | 99.5 |
| α-nucleating agent type |  | — | talc | NA11 | — | talc |
| α-nucleating agent amount | [wt.-%] | — | 0.5 | 0.2 | — | 0.5 |
| β-nucleating agent type |  | — | — | — | QA | QA |
| β-nucleating agent amount | [wt.-%] | — | — | — | 0.005 | 0.005 |
| β-content | [%] | 0 | 0 | 0 | 81 | 68 |
| PI | [%] | 4.9 | 4.9 | 4.9 | 4.9 | 4.9 |
| $M_w$ | [g/mol] | 680,000 | 680,000 | 680,000 | 680,000 | 680,000 |
| Tm | [° C.] | 167 | 167 | 167 | 153 | 154 |
| $MFR_2$ | [g/10 min] | 0.30 | 0.30 | 0.30 | 0.30 | 0.30 |
| XS | [wt.-%] | 1.7 | 1.7 | 1.7 | 1.7 | 1.6 |
| Ethylene content | [wt.-%] | — | — | — | — | — |
| Flexural Modulus | [MPa] | 2027 | 2218 | 2288 | 1885 | 2010 |
| Notched Impact Strength (−23° C.) | [kJ/m$^2$] | 9.4 | 10.6 | 9.3 | 86.5 | 61.8 |
| Notched Impact Strength (−20° C.) | [kJ/m$^2$] | 1.7 | 1.8 | 1.4 | 7.0 | 7.2 |

QA: γ-quinacridone

We claim:

1. Polypropylene composition comprising
   (a) a propylene homopolymer (A) comprising, at least 97 wt.-% propylene units,
   (b) a platelet-like inorganic filler (B) in an amount of 0.2 to 0.8 wt.-%, based on the total polypropylene composition, and
   (c) a β-nucleating agent (C) in an amount of 0.005 to 0.5000 wt.-%,
   wherein
   (i) the propylene homopolymer (A) has a polydispersity index (PI) of at least 4.0,
   (ii) the propylene homopolymer (A) has an MFR$_2$ (230° C.) of less than 3.0 g/10 min measured according to ISO 1133, and
   (iii) the amount of β-modification of the propylene homopolymer (A) is in the range of 60 to 90% determined by DSC run according to ISO 3146/part 3/method C2 using second heat scan.

2. Polypropylene composition according to claim 1, wherein the platelet-like inorganic filler (B) has α-nucleating activity.

3. Polypropylene composition according to claim 1, wherein said platelet-like inorganic filler (B) is talc.

4. Polypropylene composition according to claim 1, wherein said composition and/or the propylene homopolymer (A) is (are) not cross-linked.

5. Polypropylene composition according to claim 1, wherein said composition and/or the propylene homopolymer (A) has(have) a branching index g' of at least 0.90.

6. Polypropylene composition according to claim 1, wherein said composition does not comprise an elastomeric polymer.

7. Polypropylene composition according to claim 1, wherein said propylene homopolymer (A) is the only polymer component within said polypropylene composition.

8. Polypropylene composition according to claim 1, wherein
(a) the amount of β-modification of the polypropylene composition is in the range of 65 to 85% determined by DSC run according to ISO 3146/part 3 /method C2 using second heat scan,
and/or
(b) the polypropylene composition has a polydispersity index (PI) of at least 4.5.

9. Polypropylene composition according to claim 1, wherein said propylene homopolymer (A) is an isotactic propylene homopolymer.

10. Polypropylene composition according to claim 1, wherein said propylene homopolymer (A) has an $MFR_2$ (230° C.) of below 1.0 g/10 min measured according to ISO 1133.

11. Polypropylene composition according to claim 1, wherein said propylene homopolymer (A) has a weight average molecular weight ($M_w$) of at least 500.000 g/mol.

12. Polypropylene composition according to claim 1, wherein said polypropylene composition and/or said propylene homopolymer (A) has (have) a xylene soluble fraction of at least 1.3 wt.-% determined according to ISO 6427 as stated in the example section.

13. Polypropylene composition according to claim 1, wherein said propylene homopolymer is present within the total composition of at least 85 wt.-%.

14. Polypropylene composition according to claim 1, wherein said β-nucleating agent (C) is selected from the group consisting of N,N'-dicyclohexyl-2,6-naphthalene dicarboxyamide, quinacridone types, pimelic acid calcium salt and mixtures thereof.

15. Polypropylene composition according to claim 1, wherein said polypropylene composition has an impact strength measured according to the Charpy impact test (ISO 179(1eA)) at −20° C. of at least 6.5 kJ/m².

16. Polypropylene composition according to claim 1, wherein said polypropylene composition has a flexural modulus measured according to ISO 178 of at least 1800 MPa.

17. The polypropylene composition according claim 1, used in the production of pipes, wherein a product produced from said polypropylene composition is pipes.

18. Pipe, comprising a polypropylene composition comprising,
(a) a propylene homopolymer (A) comprising, at least 97 wt.-% propylene units,
(b) a platelet-like inorganic filler (B) in an amount of 0.2 to 0.8 wt.-%, based on the total polypropylene composition, and
(c) a β-nucleating agent (C) in an amount of 0.005 to 0.5000 wt.-%,
wherein
(i) the propylene homopolymer (A) has a polydispersity index (PI) of at least 4.0,
(ii) the propylene homopolymer (A) has an $MFR_2$ (230° C.) of less than 3.0 g/10 min measured according to ISO 1133, and
(iii) the amount of β-modification of the propylene homopolymer (A) is in the range of 60 to 90% determined by DSC run according to ISO 3146/part 3/method C2 using second heat scan.

19. Polypropylene composition according to claim 1, wherein said composition and/or the propylene homopolymer (A) has(have) a branching index g'of at least 0.95.

20. Polypropylene composition according to claim 1, wherein said propylene homopolymer is present within the total composition of at least 95 wt.-%.

21. Polypropylene composition according to claim 1, wherein said polypropylene composition has a flexural modulus measured according to ISO 178 of at least 2000 MPa.

22. Process for the manufacture of a polypropylene composition comprising:
(a) producing a propylene homopolymer (A) including at least 97 wt.-% propylene units,
(b) treating said obtained propylene homopolymer (A) with a platelet-like inorganic filler (B), in an amount of 0.2 to 0.8 wt.-%, based on the total polypropylene composition, and subsequently
(c) treating the mixture of step (b) with a β-nucleating agent (C) in an amount of 0.005 to 0.5000 wt.-%; or
producing a propylene homopolymer (A) including at least 97 wt.-% propylene units,
(b) treating the propylene homopolymer (A) of step (a) with a β-nucleating agent (C) in an amount of 0.005 to 0.5000 wt. % at temperatures in the range of 175 to 300° C.,
(c) treating said obtained mixture of step (b) with a platelet-like inorganic filler (B), in an amount of 0.2 to 0.8 wt.-%, based on the total polypropylene composition, and subsequently
(d) optionally cooling and crystallizing the polypropylene composition; or
(a) producing a propylene homopolymer (A) including at least 97 wt.-% propylene units in a multistage process, and
(b) treating said obtained propylene homopolymer (A) with a β-nucleating agent (C) in an amount of 0.005 to 0.5000 wt.-% and with a platelet-like inorganic filler (B), in an amount of 0.2 to 0.8 wt.-%, based on the total polypropylene composition, and wherein
(i) the propylene homopolymer (A) has a polydispersity index (PI) of at least 4.0,
(ii) the propylene homopolymer (A) has an $MFR_2$ (230° C.) of less than 3.0 g/10 min measured according to ISO 1133, and
(iii) the amount of β-modification of the propylene homopolymer (A) is in the range of 60 to 90% determined by DSC run according to ISO 3146/part 3/method C2 using second heat scan.

23. The process according to claim 22, further comprising the steps of extruding the polypropylene composition to form a pipe.

* * * * *